United States Patent [19]

Lin

[11] Patent Number: 5,239,901

[45] Date of Patent: Aug. 31, 1993

[54] CNC LATHE

[76] Inventor: I-Nan Lin, No. 15-2, Chien Kuo Rd., Taichung Colon Free Zone, Tan Tzu Hsiang, Taichung Hsien, Taiwan

[21] Appl. No.: 943,685

[22] Filed: Sep. 11, 1992

[51] Int. Cl.⁵ .................... B23B 3/06; B23B 7/04; B23B 13/02; B23B 23/00

[52] U.S. Cl. .................... 82/119; 82/120; 82/124; 82/148; 82/901; 29/27 C; 29/DIG. 73; 29/DIG. 94

[58] Field of Search ............ 82/117, 118, 119, 120, 82/121, 124, 125, 126, 127, 148, 901; 29/27 C, DIG. 73, DIG. 94

[56] References Cited

U.S. PATENT DOCUMENTS

| | | |
|---|---|---|
| 4,006,518 | 2/1977 | Rudolph et al. .................... 29/39 |
| 4,061,061 | 12/1977 | Lahn et al. .................... 82/127 |
| 4,304,159 | 12/1981 | Tsuchiya .................... 82/124 |
| 4,324,161 | 4/1982 | Klancnik et al. .................... 82/120 |
| 4,577,535 | 3/1986 | Klabunde et al. .................... 82/118 |
| 4,597,155 | 7/1986 | Garnett et al. .................... 82/124 |
| 4,742,739 | 5/1988 | Yamaguchi et al. .................... 82/124 |
| 4,837,918 | 6/1989 | Holy et al. .................... 29/27 C |
| 4,926,723 | 5/1990 | Lothammer .................... 82/118 |
| 4,942,650 | 7/1990 | Howarth .................... 29/38 B |
| 5,020,402 | 6/1991 | Link et al. .................... 82/124 |

FOREIGN PATENT DOCUMENTS

| | | | |
|---|---|---|---|
| 371450 | 6/1990 | European Pat. Off. .................... | 82/120 |
| 30401 | 1/1990 | Japan .................... | 82/120 |

Primary Examiner—William E. Terrell
Attorney, Agent, or Firm—Bacon & Thomas

[57] ABSTRACT

A CNC (computer numerical control) lathe includes a tailstock feed mechanism consisting of a feed hopper and an air cylinder for feeding a short workpiece, and a secondary tool turret having a feed chuck and a set of rear end cutting tools for processing the end of a bar stock material which has been processed by a main tool turret and a radial processing mechanism for processing a short workpiece delivered through the tailstock feed mechanism.

1 Claim, 7 Drawing Sheets

CNC LATHE

BACKGROUND OF THE INVENTION

The present invention relates to a CNC (computer numerical control) lathe and relates more particularly to such a CNC lathe having a secondary tool turret for processing the rear end with pick off from main spindle by counter spindle workpiece delivered through a tailstock feed mechanism.

A CNC lathe is a computerized cutting metal-working machine having a computer numerical control panel for giving instructions to a central processing unit in controlling the operation of a variety of mechanisms to process a metal workpiece. By means of the control of the central processing unit, the working efficiency and the capacity of the lathe are greatly improved. FIG. 1 illustrates an automatic lathe according to the prior state of the art. This structure of the lathe includes a work spindle mounted in the head stock on a bed thereof at bed thereof at one side and controlled to grip and rotate the workpiece, a rotary cutting tool carrier having a feed chuck and a set of cutting tools controlled to process the front end of the workpiece, and a set of radial processing mechanisms arranged around the work spindle and controlled to process the outer diameter of the workpiece. This automatic lathe can only process the outer diameter and the front end of the workpiece. Once the front end and the outer diameter of the workpiece have been processed, the workpiece is cut off and carried away. For making a bore or bolt hole on the rear end of the workpiece, the workpiece should be separately processed. Another disadvantage of this type of automatic lathe is that the work spindle can only feed an elongated metal rod out to position for processing, and therefore it is not suitable for processing a short metal workpiece. FIG. 2 illustrates another variety of CNC lathe according to the state of prior art. This variety of CNC lathe includes a main tool turret for processing the front end of the workpiece, a set of radial processing mechanisms for processing the outer diameter of the workpiece, and a tailstock tool holder supported on a horizontal slide to hold two tools for processing the rear end of the workpiece. This type of CNC lathe is still not satisfactory in performance. Because the tailstock tool holder can only carry two cutting tools, the cutting tools may have to be frequently changed according to different working requirements. Frequently changing the cutting tools greatly affect the processing speed and efficiency. Furthermore, this variety of CNC lathe has no automatic feed mechanism for feeding short metal workpiece. If a short metal workpiece is to be processed, it must be carried into position by a robot. However, the use of a robot greatly increases the installation space and cost of the lathe and complicates the maintenance work.

SUMMARY OF THE INVENTION

The present invention eliminates the aforesaid disadvantages and problems. It is therefore an object of the present invention to provide a CNC lathe which can process the front end, the rear end and the outer diameter of the metal workpiece to be worked on through a continuous processing procedure without stopping the machine. It is another object of the present invention to provide a CNC lathe which can automatically feed a long bar stock material as well as a short metal workpiece. It is still another object of the present invention to provide a CNC lathe which can automatically process the rear end of a metal workpiece according to different requirements without changing the cutting tools. It is still another object of the present invention to provide a CNC lathe which has means to automatically feed a short metal workpiece into position for processing.

One aspect of the present invention is that the CNC lathe includes a secondary rotary tool turret having a feed chuck and a set of different cutting tools controlled to process the end of the metal workpiece which has been processed by a main tool turret. One other aspect of the present invention is that the CNC lathe includes a tailstock feed mechanism consists of a feed hopper and an air cylinder controlled to feed a short metal workpiece into position for processing.

DETAILED DESCRIPTION OF THE PREFERRED EMBODIMENT

Figure 1:
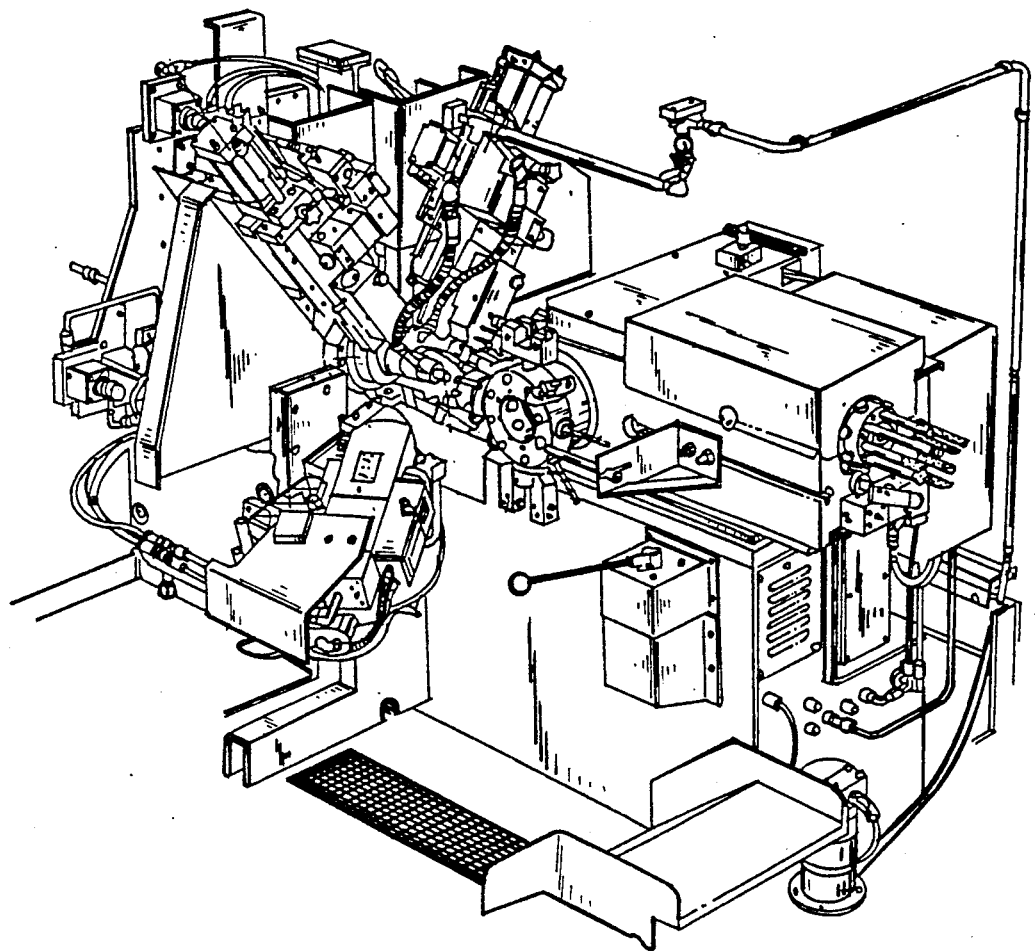
FIG. 1 is an elevational view of an automatic lathe according to the prior state of the art.
Figure 2:
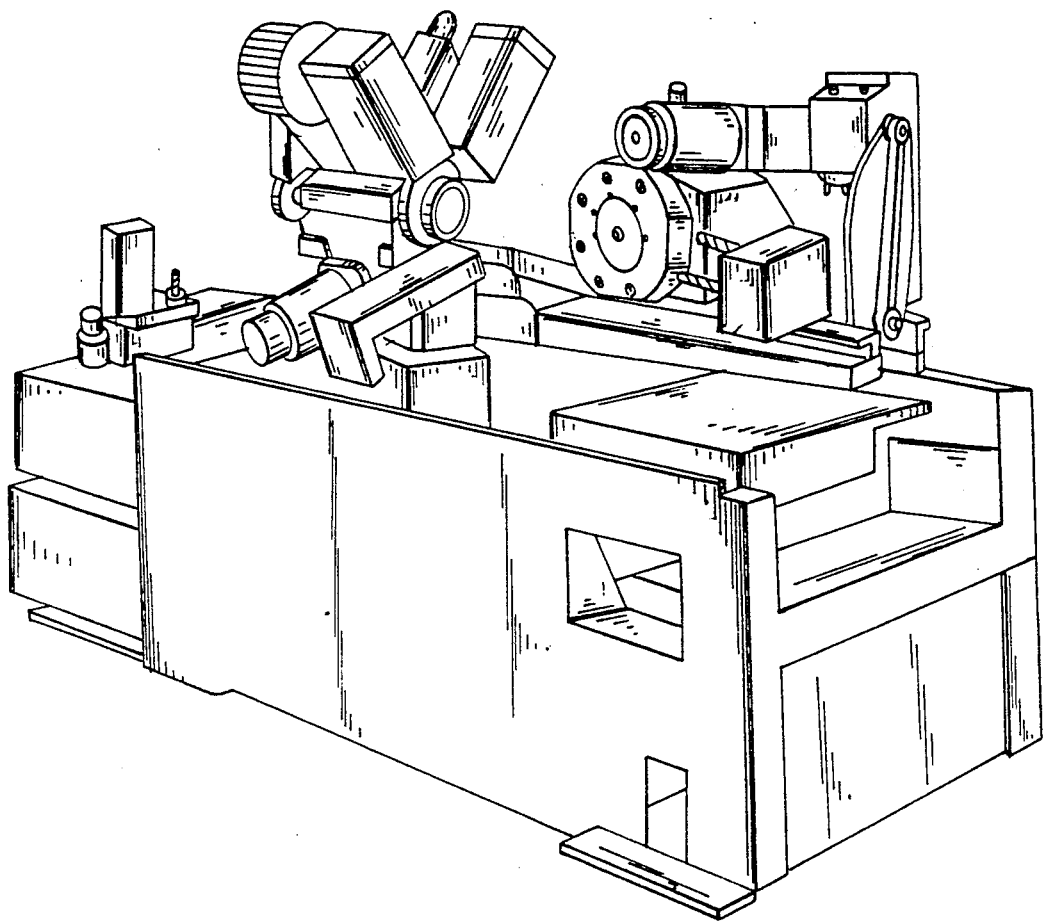
FIG. 2 is an elevational view of a CNC lathe according to the prior state of the art.
Figure 3:
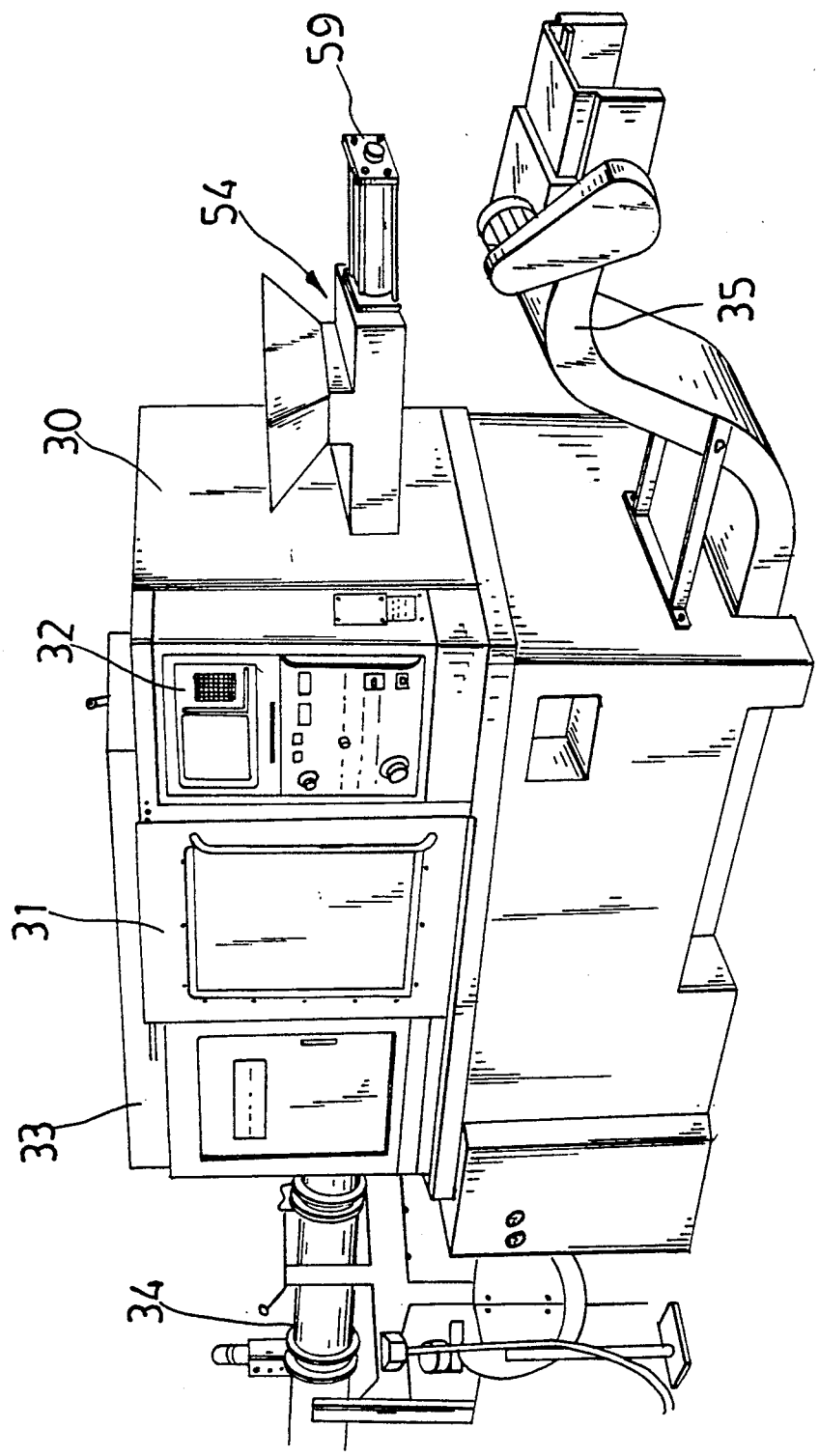
FIG. 3 is an elevational view of a CNC lathe including the present invention.

Referring to FIG. 3, the lathe body 30 of the CNC lathe includes an access door 31 and a computer numerical control panel 32 on the front side thereof, a distributing box 33 on the back side thereof, a workpiece feed mechanism 34 at one end near the distributing box 33, and a chip conveyer 35 at the opposite end extended to the inside below the access door 31 and the computer numerical control panel 32.

Figure 4:
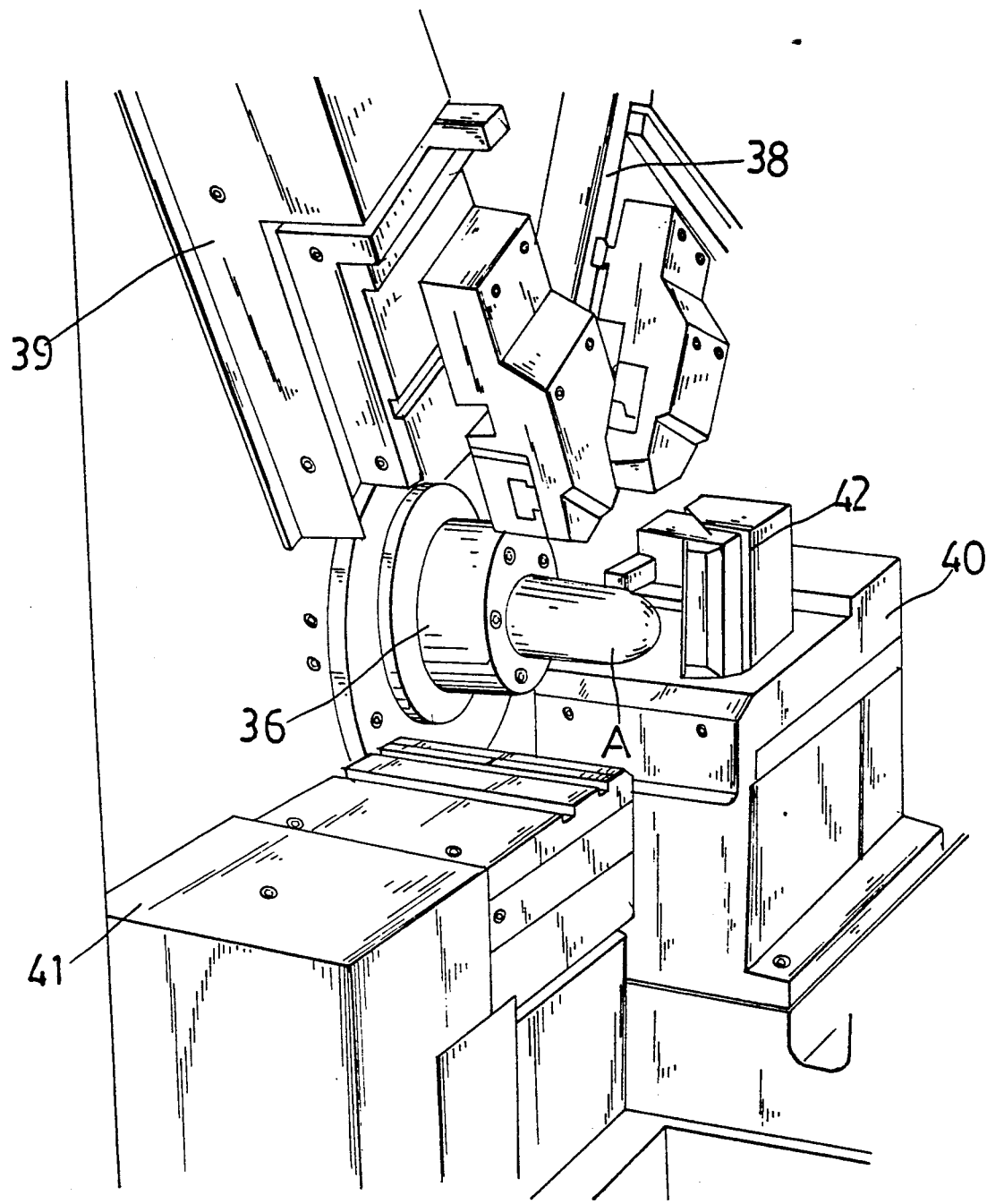
FIG. 4 is an elevational view of the work spindle and the radial processing mechanism of the CNC lathe of FIG. 3.
Figure 5:
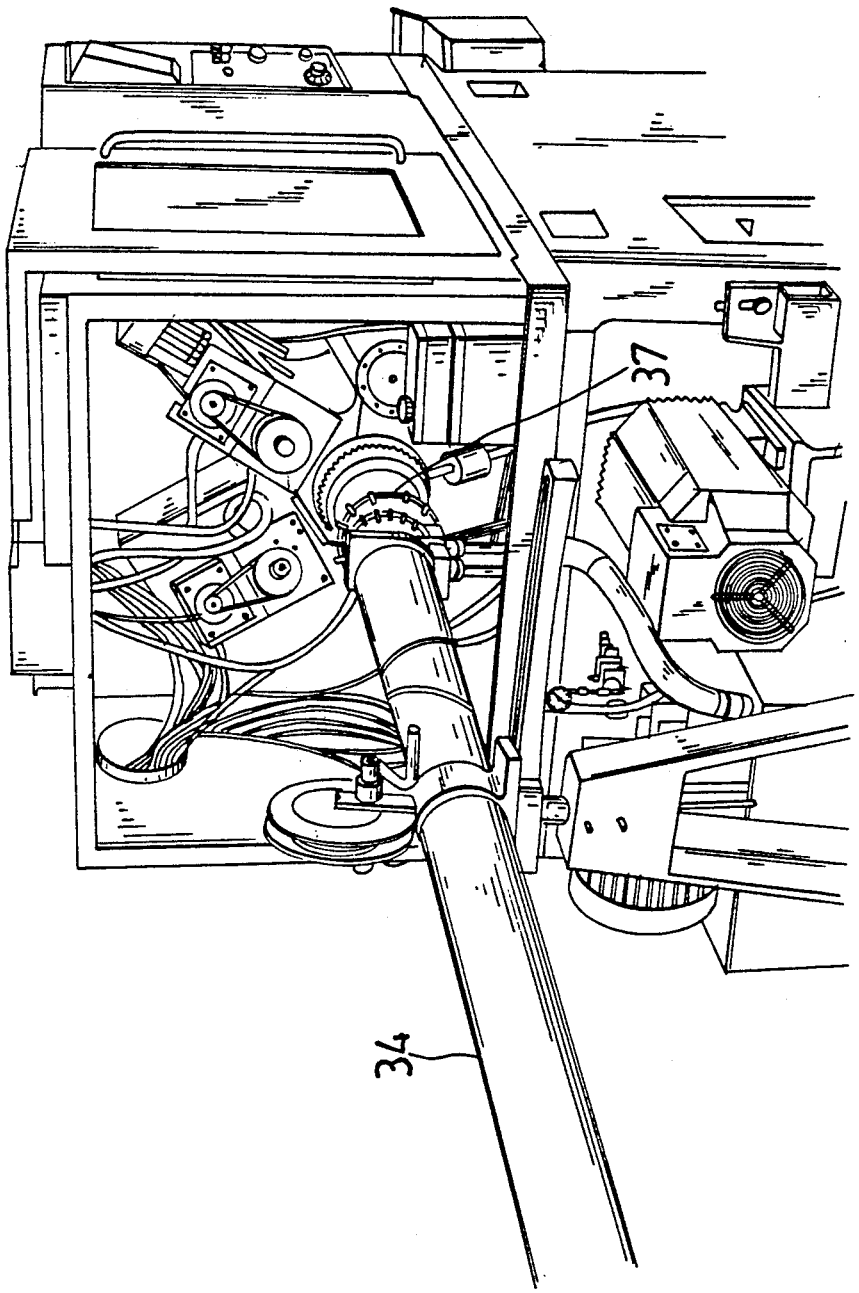
FIG. 5 is an elevational side view of the CNC lathe of FIG. 3.

Referring to FIGS. 4 and 5, there is a work spindle 36 located inside the lathe body 30. The work spindle 36 has a front end for gripping the workpiece A to be operated on, and a rear end extended to the feed mechanism 34 and driven by a transmission mechanism 37 to rotate the workpiece A. A radial processing mechanism is arranged inside the lathe body 30 around the work spindle 36. The radial processing mechanism comprises a first control axis 38 and a second control axis 39 obliquely extending outward above the work spindle 36 in different directions, a third control axis 40 disposed on the left side relative to the work spindle 36, and a fourth control axis 41 disposed on the right side relative to the work spindle 36. The control axes 38, 39, 40 and 41 each have one end coupled with a respective tool holder 42 respectively disposed adjacent to the work spindle 36. The control axes 38, 39, 40 and 41 are respectively controlled by a respective transmission mechanism to move in the directions of the X-axis and Z-axis relative to the workpiece A.

Figure 6:
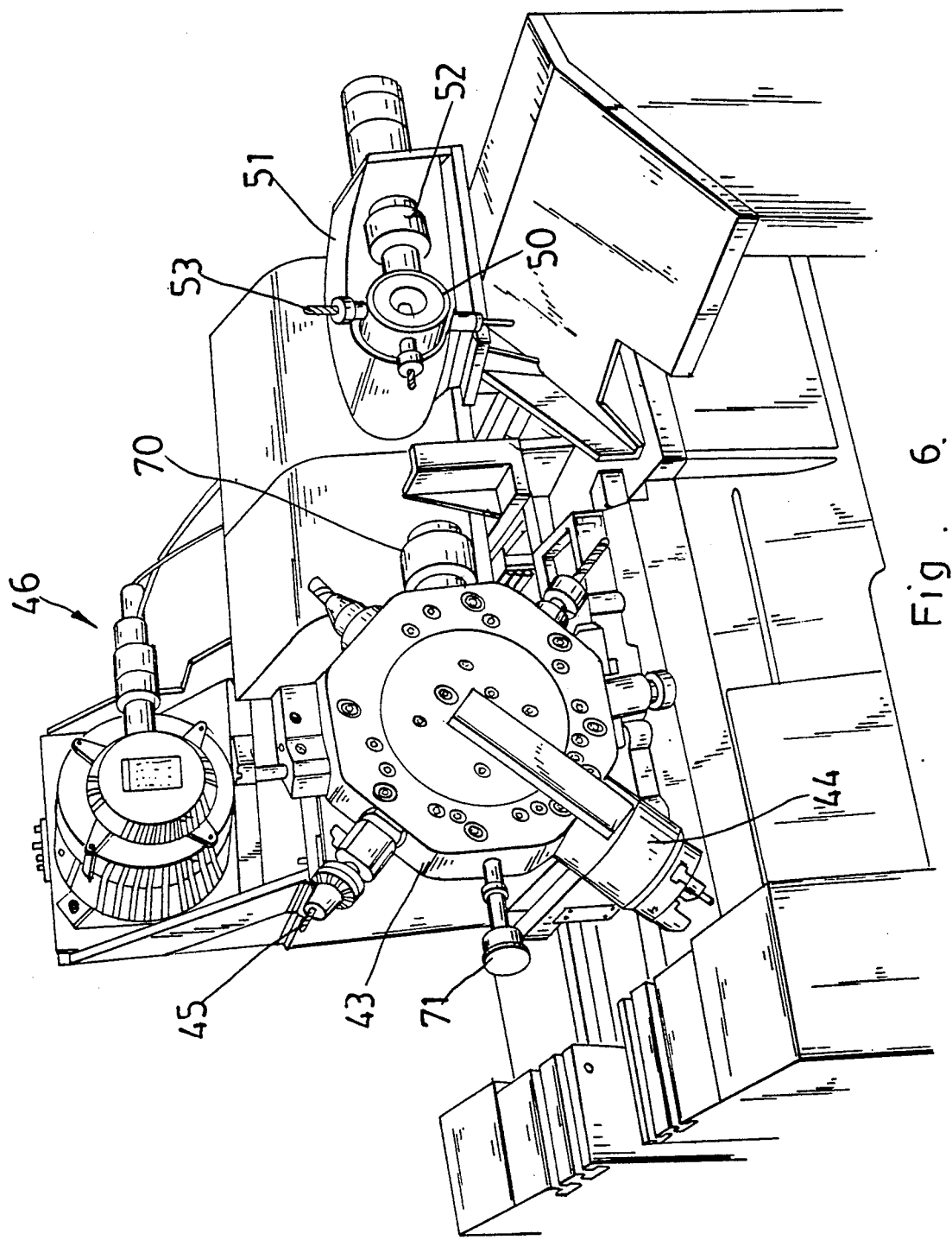
FIG. 6 is an elevational view of the internal structure of the CNC lathe of FIG. 3 showing the relative positions of the rotary tool carrier and the auxiliary rotary tool carrier.

Referring to FIG. 6, main tool turret 43 is located inside the lathe body 30 in front of the work spindle 36. The main tool turret 43 has a counter spindle 44, a feed chuck 70, and a variety of front cutting tools 45 respectively mounted around the periphery thereof. A servo motor-controlled belt drive (not shown) is located inside the main tool turret 43 to rotate the auxiliary cutting tools 45 at a high revolving speed. The counter spindle 44 is controlled by a hydraulic control mechanism to grip or release a workpiece. The servo motor-controlled belt drive and the hydraulic control mechanism form a part of a transmission system 46, i.e., the operation of the main tool turret 43 and the parts thereof is controlled by the transmission system 46. The transmission system 46 also drives the main tool turret 43 to move in the directions of X-axis and Z-axis.

Figure 7:
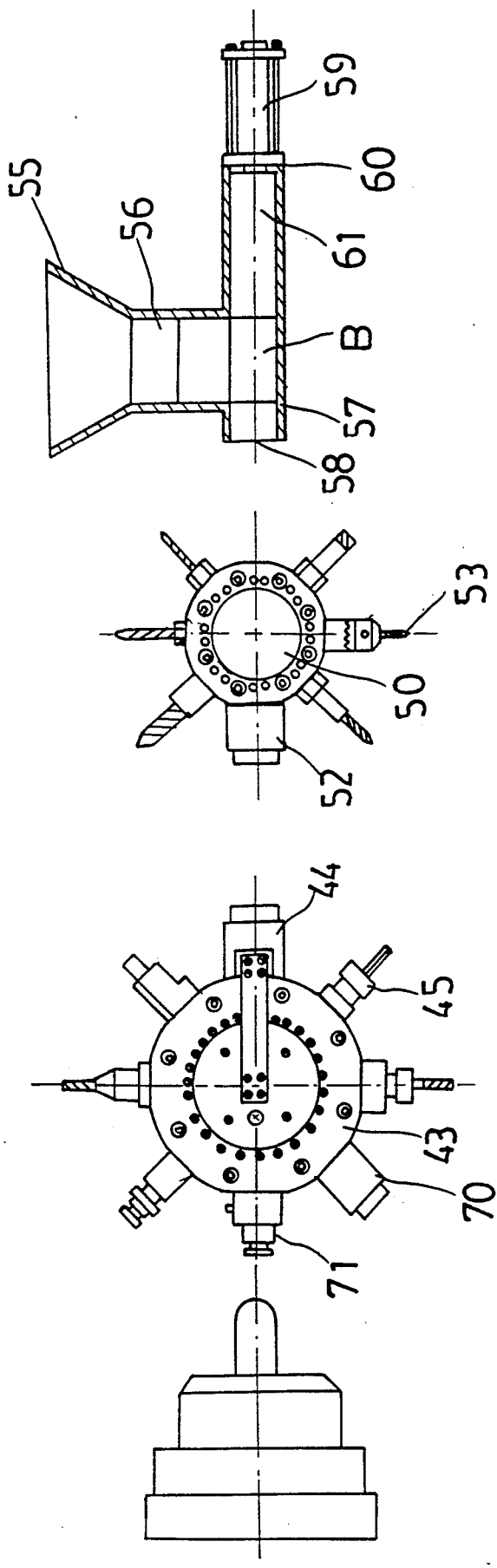
FIG. 7 is a plan view showing the arrangement of the work spindle, the rotary tool carrier, the auxiliary rotary tool carrier and the tailstock feed mechanism according to the present invention.

The aforesaid parts and mechanisms are similar to the prior state of the art and not within the scope of the present invention, and therefore no further detailed description is needed. The scope of the present invention is outlined hereinafter. Referring to FIG. 6, a secondary tool turret 50 is located inside the lathe body 30 at a location opposite to the main tool turret 43 and connected to a transmission mechanism 51. The secondary tool turret 50 has a feed chuck 52 and a variety of tail cutting tools 53 respectively mounted around the periphery thereof. The transmission mechanism 51 is controlled by the instructions given through the control panel 32 to rotate the secondary tool turret 50 clockwise or counterclockwise and also to rotate the tail cutting tools 53 on their own axes respectively. Referring to FIGS. 3 and 7, a tailstock feed mechanism which consists of a feed hopper assembly 54 and an air cylinder 55 is located to the lathe body 30 on the outside adjacent to the secondary tool turret 50. The feed hopper assembly 54 consists of a hopper 55 supported above a transverse feed guide tube 57 by a vertical feed cute 56. The transverse feed guide tube 57 has an output port 58 on one end disposed adjacent to the secondary tool turret 50 without contacting the feed chuck 52 or the tail cutting tools 53, and an opposite end coupled with the air cylinder 59. The air cylinder 59 has a plunger 60 inserted into the transverse feed guide tube 57 of the feed hopper assembly 54 and controlled to alternatively move a push block 61 back and forth.

The operation of the CNC lathe is outlined hereinafter with reference to FIGS. 4, 6 and 7. As the predetermined data was inputted through the control panel 32, the workpiece feed mechanism 34 moves the workpiece A forward and stops it against a stopper 71 on the main tool turret 43. Therefore, the workpiece A is extended out at the predetermined length. The work spindle 36 is then controlled to grip the workpiece A, and then controlled to rotate the workpiece A. At the same time, the control axes 38, 39, 40 and 41 and the front cutting tools 45 of the main tool turret 43 are respectively controlled by the central processing unit of the CNC lathe to work on the workpiece A. As soon as the workpiece A has been properly processed on the outer diameter and the front end thereof, the main tool turret 43 is controlled to move the counter spindle 44 to the workpiece A, and then the counter spindle 44 is rotated. Once the revolving speed of the counter spindle 44 becomes synchronized with the revolving speed of the work spindle 36, the main tool turret 43 is moved longitudinally toward the counter spindle 44 causing the workpiece A to be firmly retained between the work spindle 36 and the counter spindle 44. Therefore, one control axis of the radial processing mechanism can be controlled to cut off the processed part of the workpiece A. As soon as the processed part of the workpiece A was cut off, the counter spindle 44 is rotated by the main tool turret 43 180 degrees and moved to the front side of the secondary tool turret 50. The cut-off end of the processed part of the workpiece A is then processed by the tail cutting tools 53 of the secondary tool turret 50. Therefore, the processing of a workpiece can be completed through a continuous processing procedure. The tail cutting tools 53 may be different from one another for different purposes, and therefore different processing tasks can be done without changing the tail cutting tools 53. For processing a short workpiece B, which may be obtained from a bar stock material through the process of cutting, the short workpiece B is put into the feed hopper assembly 54 and guided through the vertical feed cute 56 into the transverse feed guide tube 57. The air cylinder 59 is turned on to extend out the plunger 60 causing the short workpiece B to be moved out of the output port 58 of the transverse feed guide tube 57 by the push block 61 and inserted into a hole (not shown) on the feed chuck 52 of the secondary tool turret 50. The feed chuck 52 is then controlled to grip the short workpiece B, and at the same time, the plunger 60 is moved back to its former position. Then the feed chuck 52 is rotated by the secondary tool turret 50 180 degrees to carry the short workpiece B toward the main tool turret 43. The main tool turret 43 is then moved longitudinally for permitting the feed chuck 70 to grip the short workpiece B. Once the short workpiece B is gripped by the feed chuck 70 of the main tool turret 43, the main tool turret 43 is rotated 180 degrees to move the feed chuck 70 to the work spindle 36, and at the same time, the main tool turret 43 is moved longitudinally to insert the short workpiece B into the work spindle 36 and to let the short workpiece B to be gripped by the work spindle 36. By means of the control of the central processing unit of the CNC lathe, the front end as well as the outer diameter of the short workpiece B are processed. As soon as the front end and the outer diameter of the short workpiece B have been properly processed, the counter spindle 44 of the main tool turret 43 is controlled to carry the short workpiece B to the secondary tool turret 50 for processing on the tail, and therefore the short workpiece B is continuously processed until the completion of the complete operation.

As indicated, the present invention is to install a secondary tool turret and a tailstock feed mechanism in a CNC lathe so that a workpiece can be processed through a continuous processing procedure without using any robot or frequently changing the cutting tools.

I claim:

1. A computer numerical control lathe comprises a lathe body having an access door and a computer numerical control panel on the front side thereof, a distributing box on the back side thereof, a workpiece feed mechanism at one end near said distributing box, and a chip conveyer at the opposite end extended to the inside of the lathe body; a work spindle located inside said lathe body, said work spindle having a front chuck for gripping a workpiece to be worked on and a rear end extended to said workpiece feed mechanism and driven by a transmission mechanism to rotate the workpiece; a radial processing mechanism arranged inside said lathe body around said work spindle and controlled to process the periphery of the workpiece, said radial processing mechanism comprising a first control axis and a second control axis obliquely extending outward above said work spindle in different directions, a third control axis and a fourth control axis located at two opposite sides relative to said work spindle, each control axis having one end coupled with a respective tool holder respectively disposed adjacent to said work spindle; a main tool turret located inside said lathe body opposed to said work spindle, said main tool turret having a counter spindle, a feed chuck, and a variety of front cutting tools respectively arranged around the border and controlled by said computer numerical control panel through a transmission mechanism to process the front end of the workpiece; wherein a secondary tool turret is located inside said lathe body opposite to said main tool turret and driven by a transmission mechanism controlled by instructions sent through said computer numerical control panel to process the rear end of the workpiece which has been processed by said radial processing mechanism and said main tool turret, said secondary tool turret having a feed chuck and a set of rear end cutting tools respectively mounted around a peripheral edge thereof; a tailstock feed mechanism is located to said lathe body on the outside adjacent to said secondary tool turret, said tailstock feed mechanism being comprised of a feed hopper assembly and an air cylinder, said feed hopper assembly comprising a hopper supported above a transverse feed guide chute by a vertical feed chute, said transverse feed guide tube having an output port on one end disposed adjacent to said secondary tool turret, and an opposite end coupled with said air cylinder, said air cylinder having a push block coupled to a plunger thereof inserted into said transverse feed guide tube and controlled to move a short workpiece been put into said hopper to the feed chuck of said secondary tool turret for gripping and processing.

* * * * *